Patented Jan. 16, 1934

1,943,787

UNITED STATES PATENT OFFICE 1,943,787

DYEING AND THE LIKE

David Alexander Whyte Fairweather and John Thomas, Grangemouth, Scotland, assignors to Scottish Dyes, Limited, Grangemouth, Scotland No Drawing. Application January 24, 1930, Serial No. 423,179, and in Great Britain February 8, 1929

11 Claims. (Cl. 8—5)

This invention relates to dyeing and the like. In the specification of co-pending British application No. 333,507 (4329/29) U. S. application No. 426,417 of 6/2/1930, Patent No. 1,924,774, of August 29, 1933 there is described the production among other bodies of certain sulphuric esters containing azo groups or linkages based on the diazotization of esters containing amino groups.

The object of the present invention is to provide a process suitable for the utilization of such products, and suitable for the utilization of a much wider class of products, including products which contain azo linkages and ester groups, the ester groups being in reduced quinone or related substances, for example bodies containing ketonic groups which can be reduced to hydroxy groups such as for example indigos.

The invention consists in the application of products which contain azo linkages and ester groups, the ester groups being in reduced quinone or related substances, for example bodies containing ketonic groups which can be reduced to the hydroxy groups such as, for example, indigos, in the art of dyeing.

The invention also consists in a form or modification of the process of the preceding paragraph, according to which sulphuric esters containing azo groups or linkages, or other bodies such as may be prepared by processes according to British specification No. 333,507, U. S. application No. 426,417 of 6/2/1930 are applied in the art of dyeing.

The invention also consists in a process according to either of the preceding two paragraphs, which comprises impregnating the material with the ester, and then developing by oxidation and hydrolysis.

The invention also consists in a modification of the process according to the preceding paragraph, in which the products are employed without development.

The invention also consists in a process according to either of the preceding two paragraphs in which, instead of starting with the dyestuff ester already synthesized, synthesis is carried out on the fibre.

The invention also consists in a modification of the processes according to any of the preceding five paragraphs, in which the products are used as azo dyes, for example, as azo dyes of which neither constituent is sufficiently soluble to pad on fibres, and which therefore could not according to previous practice be employed as dyestuffs.

The invention also consists in the application of products of processes as indicated above, in the coloration of all materials, including cotton, wool, silk, artificial silk (including cellulose esters), this coloration being effected, for instance, by dyeing, printing, padding or pigmenting.

The invention also consists in processes substantially as herein described, and in products when made by those processes, or by the obvious chemical equivalents thereof.

The following examples indicate how the invention may be carried into effect, references to parts and percentages being to parts and percentages by weight:—

Example 1

This is an example of the use of the product obtained by diazotizing 2-amino-anthrahydroquinone-9:10-disulphuric ester and coupling with $\beta$-naphthol. The product apparently has the constitution illustrated in the diagram.

0.1 part of the dyestuff is dissolved in 200 parts of water. 10 parts of cotton thoroughly wetted out are entered into the dye-bath at 40° C., and kept at this temperature for half an hour. 10 parts of salt are then added to the dye-bath, and dyeing continued for another half hour at 50° C.

The following diagram shows what appears to be the constitution of the product obtained:—

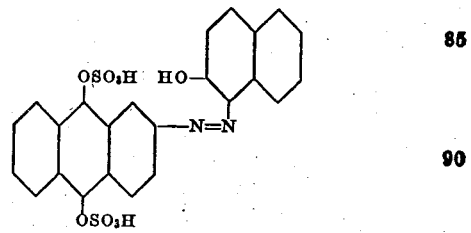

The product is then lifted from the dye-bath, rinsed and developed in a bath containing half per cent. of ferric chloride and half per cent. hydrochloric acid at 40–45° C. for about five minutes. Before developing the product is a purplish shade, but after developing becomes a bright orange-red.

Example 2

This is an example of the application of the same product to wool. The dye-bath can be made up the same as before, the wetted wool entered and dyed at 40–50° C. for three quarters of an hour. Development is carried out in a solution containing 1 per cent. of ferric chloride and 1 per cent. of hydrochloric acid at 70–75° C.

Silk may be dyed similarly, being developed in a bath containing one half per cent. of acid and one half per cent. of ferric chloride at 50° C.

Example 3

In this example the product obtained by coupling diazotized 2-amino-anthranhydroquinone-9:10-disulphuric ester with naphthol AS T.R. is used. Dyeing is carried out similarly to the method of Example 1, but 5 parts of salt are added instead of 10 parts. Addition of too much salt appears to cause the material to separate out.

Example 4

This is an example of a substituted amino ester, the product obtained by coupling 2-diazo-3-chlor-anthra-hydroquinone-disulphuric acid ester, with the o-anisidide of $\beta$-oxy-naphthoic acid being used. After development the red dyeing is given a soap treatment which considerably brightens the shade and increases the fastness to bleaching.

Example 5

This is an example of the use of a product made in a manner different from those in previous examples. In the previous examples an amino-body containing an ester group is diazotized and then coupled with another constituent. In this example a body is used prepared by taking an intermediate containing an ester and coupling this with a diozotized body, for example 0.17 part of the dyestuff made by coupling diazotized p-nitraniline with $\beta$-aminoanthrahydroquinone-disulphuric acid ester is dissolved in 200 parts water. A cotton hank of weight 10 parts is entered into the purple solution at 40° C. and the temperature raised to 60° C. After working at 60° C. for 15 minutes, 5 parts of salt are added and after a further 15 minutes a further 5 parts of salt. The material is then soaked in the bath for 30 minutes or until no more absorption of colour takes place. The hank is then lifted, squeezed as dry as possible, and developed as in previous examples, when the red-purple dyeing changes to brown.

Example 6

This is an example of the formation of the azo dyestuff on the fibre.

Cotton cloth padded in a 0.3 per cent. solution of the anilide of beta-hydroxy-naphthoic acid and dried, is immersed in the diazo solution made as follows:—

4.8 parts of the sodium salt of beta-amino-anthrahydroquinone-disulphuric acid ester are dissolved in 140 parts water and ice added together with 3.4 parts of concentrated hydrochloric acid. Diazotization is effected by adding all at once with stirring, 0.77 part of sodium nitrite in concentrated solution at 0–5° C. The excess of acid is neutralized with 1.5 parts sodium bicarbonate and water is then added to make 500 parts in all. The padded cloth is then entered into the diazo solution at about 5° C. and soaked for 15–20 minutes until there is no further increase in depth of shade. The cloth is then lifted and rinsed, and developed in a suitable acid oxidizing agent.

Example 7

Instead of lifting the material in the last example from the diazo solution and further treating in a separate bath to produce the final shade, there may be added to the diazo solution, after coupling is complete, 10 parts of concentrated hydrochloric acid and 1 part of sodium nitrite in concentrated solution. The temperature of the bath is raised to 50° C. and after a few minutes the hydrolysis and oxidation is finished. The material is then lifted and washed. A red dyeing results.

Example 8

For the development of the final colour there may be used instead of acid ferric chloride or nitrous acid other oxidizing agents, for example, a cupric salt.

For cotton and viscose a bath of 2 per cent. cupric sulphate crystals and 1 per cent. hydrochloric acid, we find to work very well and for wool and silk, the same bath with an additional 1 per cent. of hydrochloric acid. In both cases the temperature of development is 90° C. and salt may be added to the bath if any tendency to bleeding is shown.

Example 9

This example is a variation of Example 7. The variation consists of adding the sodium nitrite required for the development to the diazo solution before immersion of the material therein. Development is then effected by the addition of 10 parts of concentrated hydrochloric acid and heating the bath to 50° C.

Example 10

In this example the product obtained by coupling 2 molecules of the disulphuric ester of 2-amino-3-chlor-anthrahydroquinone with 1-molecule 5:5'-dihydroxy-2:2'-dinaphthyl-urea-7:7'-disulphuric acid is dyed from an aqueous bath in a similar manner to Example 1, when a brownish-violet shade is obtained on cotton which changes to red on development.

Example 11

This is similar to Example 10 except that the product obtained by coupling 1 molecule of the disulphuric ester of 2-amino-3-chlor-anthrahydroquinone with 1 molecule 2-amino-8-naphthol-6-sulphonic acid is used. This gives reddish-blue shade of very good milling fastness.

Example 12

This is similar to Example 11, except that instead of 2-amino-8-naphthol-6-sulphonic acid the product from 2-phenyl-amino-5-naphthol-7-sulphonic acid is used.

Example 13

This is an example of the use of a disazo dye, for example, the product obtained by coupling with 1:8-amino-naphthol-3:6-disulphonic acid-2-diazo-3-chlor-anthra-hydro-quinone-9:10-disulphuric acid ester (in acid solution) and benzene diazonium chloride (in alkaline solution). This dyestuff can be dyed by the methods of the previous examples.

On wool it gives violet shades which are changed to blue by development.

The dyestuff can also be used on cotton.

Instead of dyeing the finished dyestuff, one or more stages of such a synthesis may, if desired, be carried out on the fibre, for instance, cotton may be dyed with the ester, diazotized on the fibre, coupled, further diazotized and further coupled.

Example 14

The following mixture is printed on cotton.

- 15 parts of a 15 per cent. colour paste of the dyestuff obtained by coupling 2-amino-3-chlor-anthrahydroquinone-disulphuric ester with the o-anisidide of 2-hydroxy-3-naphthoic acid.
- 10 parts water.
- 75 parts gum tragacanth thickening (6 per cent.)

100 parts

The print is then preferably steamed at 100° C. for 15 minutes. Development is then carried out at 35° C. in a solution of 1 part of sodium nitrite and 1.8 parts sulphuric acid in 100 parts water, or at 30° C. in a solution of 1 part each of ferric chloride and concentrated hydrochloric acid in 100 parts of water.

Example 15

In this example the sodium nitrate is incorporated in the printing paste. The cotton is printed with the following mixture.

- 20 parts of colour paste as in previous examples,
- 70 parts of gum tragacanth thickening (6 per cent.)
- 1.5 parts of sodium nitrite.
- 8.5 parts of water 100 parts The print is then steamed at 102° C. for 15 minutes and developed in a bath of sulphuric acid at 1.8 per cent. strength at 50° C. After well washing, the fabric is soaped at the boil.

Example 16

In this example the final colour is developed directly by steaming. The material is printed with the following mixture.

- 15 parts 15 per cent. colour paste as in Example 15.
- 5 parts water.
- 50 parts gum tragacanth thickening (6 per cent.)
- 8 parts sodium chlorate
- 4 parts 50 per cent. ammonium thiocyanate
- 10 parts ammonium vanadate (0.1 per cent.)
- 8 parts water, glycol or resorcin.

The printed fabric is steamed for 10 minutes and then soaped at the boil.

Example 17

This is an example of the resist style.

A suitably thickened solution of formosul (10 per cent.) or similarly acting reserving substance such as sodium carbonate, sodium acetate, is printed on the cloth and the fabric is then overprinted with the following mixture.

- 15 parts colour paste as above
- 10 parts glycol
- 3 parts water
- 50 parts gum tragacanth thickening (6 per cent.)
- 8 parts sodium chlorate (10 per cent.)
- 4 parts ammonium thiocyanate (50 per cent.)
- 10 parts ammonium vanadate (0.1 per cent.)

100 parts

The printed cotton is steamed for 10 minutes and soaped at the boil.

Example 18

This is an example of a discharge print. Cotton cloth previously printed with the colour used in the above examples was discharged by printing on the following mixture.

- 25 parts of formosul
- 70 parts British gum thickening (30 per cent.)
- 5 parts water 100 parts In place of water an equal amount of 30 per cent. anthraquinone paste may be used.

The printed fent is steamed for 5 minutes then boiled for two minutes in a bath containing 5 parts each of soap and 76° Tw. caustic soda per 1000 parts water.

General

The invention is of comprehensive scope.

The dyestuffs either before or after development can be treated with chroming agents, or other substances with the object of forming mordants. Thus, after developing, the dyes may be further afterchromed if desired. Chroming may be combined with developing by using, for example, a chrome oxidizing agent.

The products, in addition to containing one or more azo linkages, may include in their structure esters of, for example, reduced quinones or reduced indigos, including reduced anthraquinone and naphtho quinone derivatives, reduced vat dyestuffs and their substitution products or derivatives.

The invention includes as starting materials bodies containing esters with amino groups or esters containing hydroxy groups. In the case of an ester which contains an amino group the process may consist in diazotizing this amino group and then coupling the product with, for instance, an amine or phenol or the like. In the case of an ester containing an amino group or an hydroxy group the ester may be coupled with a diazo body as distinct from starting with an ester containing an amino group, diazotizing this and coupling the product with an amine or phenol.

As regards the method of application, that which appears to be of principal commercial importance consists in impregnating the material with the ester, and then developing by oxidation and hydrolysis, although the products apparently—at least in many instances—being also azo dyes, may be employed otherwise, for example, as with azo dyes.

The products appear to have generally an affinity for the fibre, and can be dyed from aqueous baths at temperatures varying from cold to boiling.

Common salt and Glauber's salt may be added to aid exhaustion in some cases, while with animal fibres a little acid such as sulphuric or acetic may be of advantage in the dyeing. Development takes place with acid oxidizing agents, for example, with acid sodium nitrite or with acid ferric chloride, the usual proceedings being to give the dyed material a short treatment in preferably a dilute solution of the acid oxidizing agent at a raised temperature. The oxidizing agent may be in some cases added to the dyeing bath, and the product then developed by simple treatment with acid. The goods may also be steamed either wet or dry before developing. With cellulose acetate a dry steaming is recommended. Development may also be carried out during the steaming, oxidizing agents and catalysts being present before steaming, along with, for example, substances such as ammonium sulphate, which take the part of acids in the steaming process. Instead of dyeing, the goods may be applied by the pad or slop-pad methods. In this case a much more concentrated solution of colour is preferably used, while gum may be added to the bath in addition.

For printing the dyestuff may be mixed with a suitable gum thickening and then steamed and passed through a developing bath. Alternatively the oxidizing agent may be added during the printing, and oxidizing catalysts may be added in addition, for example, ferri cyanides or vanadates, and developed by steaming acid reacting substances being present. Assistants may be added to the paste, such as glycols, to improve the quality of the prints. The substances containing azo groups, printing has the great advantage that reserve and discharged patterns may be obtained.

To refer to the starting materials, the compounds may be regarded as comprising two parts, that containing the ester with the remaining portion containing the azo linkage.

As starting materials apart from bodies containing ester groups there may also be used the usual classes of azo compounds such as amines and phenols; naththylamines and naphthols; and their sulphonic acid; aminonaphthol-sulphonic acids; naphthol carboxylic acids and their arylides; benzidine and substituted benzidines; pyrazolones and the like.

The compounds may be synthesized for example, by analogous methods to those used in synthesizing ordinary azo colours except that one or more or, in fact, all of the constituents will apparently contain ester groups.

Instead of starting with the dyestuff ester already synthesized, synehesis may be carried out on the fibre, and the product then developed. Some advantages which these compounds offer may be seen from the following, for example, many insoluble azo colours which previously had to be synthesized on the fibre can now be dyed directly in the form of their esters, and then developed.

The invention also makes it possible to colour fabrics with azo dyes of which neither constituent is sufficiently soluble to pad on fibres, and which therefore could not be used as a dyestuff in present circumstances.

It may be noted that bodies used for coloration according to the present invention, at least many of them, either in the form of esters or after development, should not be regarded as vat dyestuffs. Bodies containing azo linkages cannot be regarded as vat dyestuffs, as the process of vatting will generally or always degrade the compound by reduction of the azo linkage with formation of two amines.

As indicated above, the present invention includes the use of products as indicated herein as pigments for general purposes.

Although the structural constitution of all the compounds preparable as indicated above is not known with certainty it appears that the ester groups are attached to the reduced quinone position.

Reference to reduced quinones in this specification includes leuco indigoid dyestuffs.

We claim:

1. The process which consists in applying sulphuric esters of reduced products of the group consisting of vat dyestuffs, anthraquinones, naphthoquinones and indigos having the ester groups attached to the reduced quinone positions and containing an azo linkage to textile fibres and subjecting the thus treated fibres to the action of an acid oxidizing agent.

2. The process which consists in applying sulphuric esters of reduced products of the group consisting of vat dyestuffs, anthraquinones, naphthoquinones and indigos having the ester groups attached to the reduced quinone positions and containing an azo linkage to textile fibres and subjecting the thus treated fibres to the action of ferric chloride.

3. The process which consists in the application to the art of colouring of a body having the following constitution, namely,

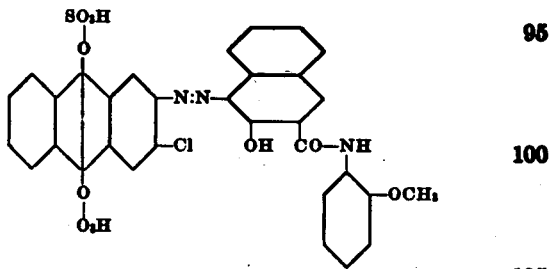

4. The process which consists in applying sulphuric esters of reduced products of the group consisting of vat dyestuffs, anthraquinones, naphthoquinones and indigos having the ester groups attached to the reduced quinone positions and containing an azo linkage to textile fibres and subjecting the thus treated fibres to the action of an acid oxidizing agent which is also a mordant.

5. The process which consists in applying sulphuric esters of reduced anthraquinones, having the ester groups attached to the reduced quinone positions, and containing an azo linkage attached to the anthraquinone in the $\beta$-position in the art of colouring.

6. The process which consists in applying compounds containing the group—

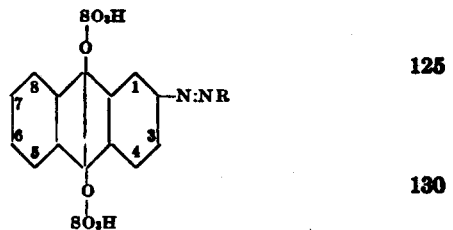

in the art of colouring where R is an aryl residue and both this aryl residue and at least one of the positions 1, 3, 4, 5, 6, 7, 8 of the anthraquinone residue carries substituents which are not sulphonic groups.

7. The process which consists in applying compounds containing the group—

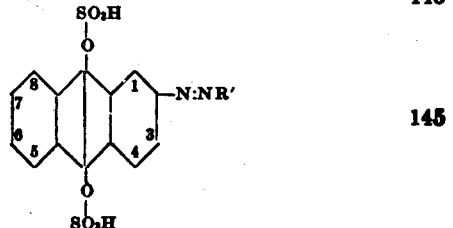

in the art of colouring where R' is a residue of β-hydroxy-naphthoic acid and at least one of the positions 1, 3, 4, 5, 6, 7, 8 of the anthraquinone residue carries substituents which are not sulphonic acid groups.

8. The process which consists in applying sulphuric esters of reduced anthraquinones, having the ester groups attached to the reduced quinone positions and containing an azo linkage attached to the anthraquinones in the β position, to textile fibres and subjecting the thus treated fibres to the action of an acid oxidizing agent.

9. The process which consists in applying compounds containing the group—

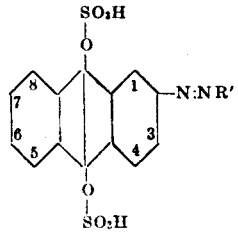

to textile fibres, and subjecting the thus treated fibres to the action of an acid oxidizing agent where R is an aryl residue and both this aryl residue and at least one of the positions 1, 3, 4, 5, 6, 7, 8 of the anthraquinone residue carries substituents which are not sulphonic groups.

10. The process which consists in applying compounds containing the group—

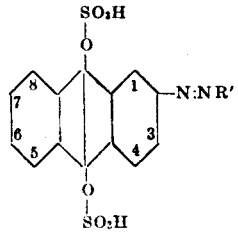

to textile fibres, and subjecting the thus treated fibres to the action of an acid oxidizing agent where R' is a residue of β-hydroxynaphthoic acid and at least one of the positions 1, 3, 4, 5, 6, 7, 8 of the anthraquinone residue carries substituents which are not sulphonic acid groups.

11. The process which consists in applying the body having the following composition—

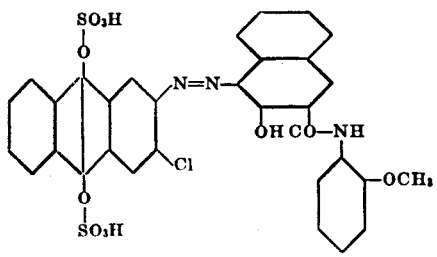

to textile fibres, and subjecting the thus treated fibres to the action of an acid oxidizing agent.

DAVID ALEXANDER WHYTE
FAIRWEATHER.
JOHN THOMAS.